US007929453B2

(12) United States Patent
Parolkar et al.

(10) Patent No.: US 7,929,453 B2
(45) Date of Patent: Apr. 19, 2011

(54) METHOD AND APPARATUS FOR PRESENTING QUALITY INFORMATION IN A COMMUNICATION SYSTEM

(75) Inventors: Satish Parolkar, Austin, TX (US); Anil Doradla, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 633 days.

(21) Appl. No.: 11/531,356

(22) Filed: Sep. 13, 2006

(65) Prior Publication Data

US 2008/0062887 A1 Mar. 13, 2008

(51) Int. Cl.
*H04J 1/16* (2006.01)

(52) U.S. Cl. ........................................ 370/252; 370/352

(58) Field of Classification Search ............... 370/241.1, 370/352–356, 252
See application file for complete search history.

(56) References Cited

U.S. PATENT DOCUMENTS

| | | | |
|---|---|---|---|
| 6,826,194 | B1 | 11/2004 | Vered et al. |
| 6,850,525 | B2 * | 2/2005 | Mitsumori et al. ....... 370/395.52 |
| 7,149,188 | B2 * | 12/2006 | Wilson .......................... 370/235 |
| 7,263,095 | B1 * | 8/2007 | Sarkar ........................... 370/352 |
| 7,295,549 | B2 * | 11/2007 | Pepin et al. .................... 370/352 |
| 7,336,649 | B1 * | 2/2008 | Huang ........................... 370/352 |
| 7,397,778 | B2 * | 7/2008 | Jay et al. ....................... 370/332 |
| 7,430,179 | B2 * | 9/2008 | von Stauber et al. ......... 370/252 |
| 7,653,002 | B2 * | 1/2010 | Hardy et al. .................. 370/252 |
| 2001/0043577 | A1 | 11/2001 | Barany et al. |
| 2003/0074443 | A1 | 4/2003 | Melaku et al. |
| 2004/0085898 | A1 | 5/2004 | Gass |
| 2005/0226193 | A1 * | 10/2005 | Karhiniemi et al. .......... 370/338 |
| 2005/0238026 | A1 | 10/2005 | Wu et al. |
| 2005/0286486 | A1 | 12/2005 | Miller |
| 2006/0002377 | A1 * | 1/2006 | Skog et al. .................... 370/352 |
| 2006/0020697 | A1 | 1/2006 | Kelso et al. |
| 2006/0025149 | A1 * | 2/2006 | Karaoguz et al. .......... 455/452.2 |
| 2006/0031469 | A1 | 2/2006 | Clarke et al. |
| 2006/0077949 | A1 | 4/2006 | Allen et al. |
| 2006/0268781 | A1 * | 11/2006 | Svensson et al. ............. 370/331 |
| 2007/0041372 | A1 * | 2/2007 | Rao et al. ...................... 370/356 |
| 2007/0110034 | A1 * | 5/2007 | Bennett ......................... 370/352 |
| 2008/0049613 | A1 * | 2/2008 | Nowlan ......................... 370/230 |

FOREIGN PATENT DOCUMENTS

| | | |
|---|---|---|
| EP | 1 670 161 A2 | 6/2006 |
| JP | 9-205427 A | 8/1997 |
| JP | 2004-153812 A | 5/2004 |

* cited by examiner

*Primary Examiner* — Kwang B Yao
*Assistant Examiner* — Candal Elpenord
(74) *Attorney, Agent, or Firm* — Guntin Meles & Gust, PLC; Pablo Meles

(57) ABSTRACT

A method and apparatus for presenting quality information in a communication system is disclosed. An apparatus that incorporates teachings of the present disclosure may include, for example, a terminal device having a controlling element for processing Voice over IP (VoIP) data exchanged with a communication system, and a display element that presents one or more quality indicators adjusted according to quality information retrieved from the VoIP data. Additional embodiments are disclosed.

15 Claims, 3 Drawing Sheets

METHOD AND APPARATUS FOR PRESENTING QUALITY INFORMATION IN A COMMUNICATION SYSTEM

FIELD OF THE DISCLOSURE

The present disclosure relates generally to communication systems, and more specifically to a method and apparatus for presenting quality information in a communication system.

BACKGROUND

It is common for a VoIP call to traverse more than one independently operated IP and TDM (Time Division Multiplexed) network. Consequently, when there is degradation in VoIP communications it is not always apparent which network is affecting communications.

A need therefore arises for a method and apparatus that presents quality information in a communication system.

DETAILED DESCRIPTION OF THE DRAWINGS

Embodiments in accordance with the present disclosure provide a method and apparatus for presenting quality information in a communication system.

In a first embodiment of the present disclosure, a terminal device can have a controlling element for processing Voice over IP (VoIP) data exchanged with a communication system, and a display element that presents one or more quality indicators adjusted according to quality information retrieved from the VoIP data.

In a second embodiment of the present disclosure, a network element can have a controlling element for processing Voice over IP (VoIP) data exchanged with a terminal device, and for generating quality information supplied to the terminal device for presenting one or more quality indicators corresponding to the quality information.

In a third embodiment of the present disclosure, a computer-readable storage medium in a terminal device can have computer instructions for processing Voice over IP (VoIP) data associated with a communication system, and presenting quality information retrieved from the VoIP data.

Figure 1:
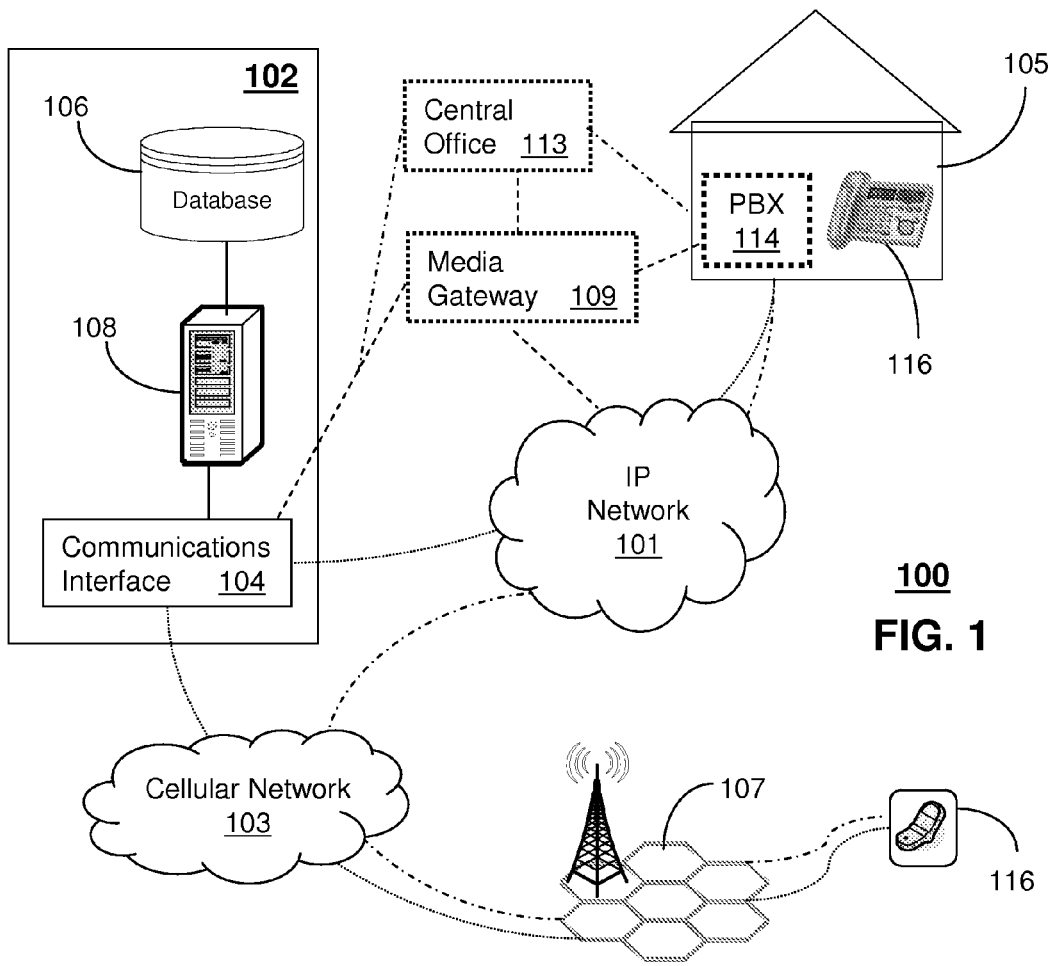
FIG. 1 depicts an exemplary embodiment of a communication system.

FIG. 1 depicts an exemplary embodiment of a communication system 100. The communication system 100 can comprise an IP (Internet Protocol) network 101 coupled to a network management system (NMS) 102, a cellular network 103 and network elements located in a building 105 representing an enterprise or residence. The IP network 101 utilizes common technology for transporting Internet traffic. In an enterprise setting, the building 105 can include a PBX 114 or other interface to the IP network 101 (e.g., xDSL, Cable, satellite, etc.) that provides voice and/or video connectivity services to a terminal device 116 such as a POTS (Plain Old Telephone Service) phone terminal, a Voice over IP (VoIP) phone terminal, or a video phone terminal. In a residential setting, the building 105 can include POTS, VoIP or video phone terminals coupled to the IP network 101 or a central office 113 utilizing conventional telephonic switches for processing calls with third parties.

Communications between the NMS 102, the terminal devices 116 and other network elements of the communication system 100 can conform to any number of signaling protocols such as signaling system 7 (SS7), session initiation protocol (SIP), or H.323.

The NMS 102 can be used to control operations of a media gateway 109, the central office 113 and the PBX 114. To perform such operations, the NMS 102 can comprise a communications interface 104 that utilizes common technology for communicating over an IP or circuit-switched interface with the IP network 101, the media gateway 109, or the cellular network 103. By way of the communications interface 104, the NMS 102 can direct by common means any network element of the communication system 100 to establish circuit switched and/or packet switched connections between terminal devices 116 distributed throughout the communication system 100. The NMS 102 can include a controller 108 that makes use of computing technology such as a desktop computer, or scalable server for controlling operations of the NMS 102. The controller 108 can be coupled to a high capacity storage medium such as a high density disk drive for managing a database 106 of network information. The NMS 102 can operate as an IP Multimedia Subsystem (IMS) conforming in part to protocols defined by standards bodies such as 3GPP (Third Generation Partnership Protocol).

Under the control of the NMS 102, the media gateway 109 can link packet-switched and circuit-switched technologies such as the cellular network 103 or central office 113 to the IP network 101, and vice-versa. The media gateway 109 can conform to a proprietary media gateway control protocol (MGCP) or an open standard such as H.248 defined in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between disparate circuit-switched and packet-switched network elements of the communication system 100. The media gateway 109 can therefore support hybrid communication environments such as VoIP to POTS and vice-versa.

The cellular network 103 can support voice and data services such as GSM-GPRS, EDGE, CDMA-1X, UMTS, and other known technologies. The cellular network 103 is coupled to base stations 107 under a frequency-reuse environment for communicating over-the-air with roaming terminal devices 116.

Figure 2:
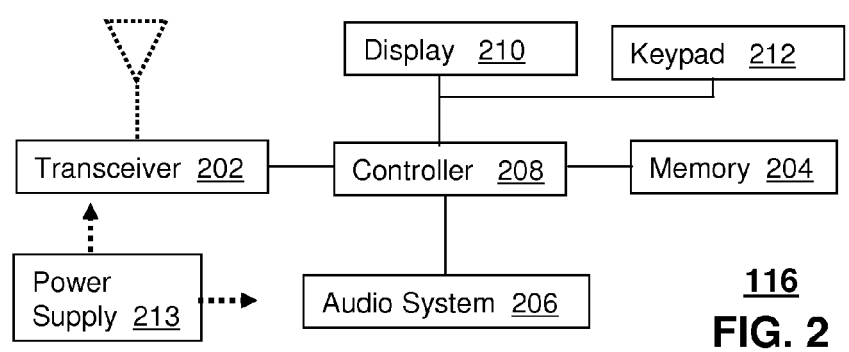
FIG. 2 depicts an exemplary embodiment of a terminal device operating in the communication system.

FIG. 2 depicts an exemplary embodiment of the terminal devices 116 of FIG. 1. In one embodiment, the terminal device 116 can be embodied in an immobile device (e.g., a wireline phone such as a POTS, VoIP or video terminal). In another embodiment, the terminal device 116 can include short range communications technology (e.g., a cordless phone, Bluetooth or WiFi) to support mobility within a small area such as the end user's residence. Alternatively, the terminal device 116 can represent a mobile terminal device utilizing a wireless transceiver 202 that supports long-range wireless communications such as supported by the cellular network 103. The wireless transceiver 202 of terminal device 116 utilizes technology for exchanging voice and data messages with the base stations 107, which in turn relay said messages to targeted end user terminals 116. Alternatively, the cellular network 103 can be replaced or enhanced with a network of WiMax cells. In a multimode embodiment, the terminal device 116 can utilize a transceiver 202 that supports the aforementioned wireless and wireline access technologies (e.g., POTS, WiFi, Bluetooth™, cordless, WiMax, and cellular).

Each of these embodiments of the terminal device 116 can utilize a memory 204, an audio system 206, and a controller 208. The memory 204 can comprise storage devices such as RAM, SRAM, DRAM, and/or Flash memories. The memory 204 can be a separate or integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature.

The controller 208 can manage the foregoing components of the terminal device 116 with computing technology such as a microprocessor and/or digital signal processor. The terminal devices 116 can further include a display 210 for conveying images to the end user, a keypad 212 for manipulating operations of the communication device, and a portable power supply 213. The audio system 206, display 210, and the keypad 212 can singly or in combination represent a user interface (UI) for interfacing with the end user.

Figure 3:
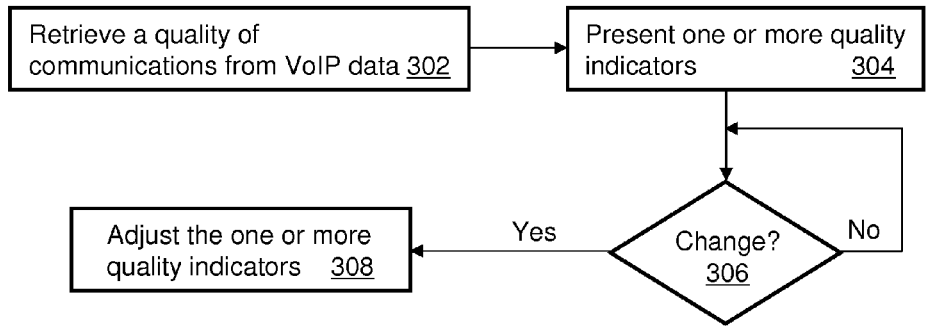
FIG. 3 depicts an exemplary method operating in portions of the communication system.

FIG. 3 depicts an exemplary method 300 operating in portions of the communication system 100. Method 300 begins with step 302 in which a terminal device 116 retrieves quality information from a VoIP session established with another terminal device 116. The quality information can be derived from signaling information conforming to a session initiation protocol (SIP) supplied by one or more network elements of the communication system 100. The network elements can be packet-switched or circuit-switched elements that utilize common measurement techniques to compute packet loss rate, latency, jitter, or other forms of network performance at various points in the communication system 100 during an established VoIP session.

Figure 5:
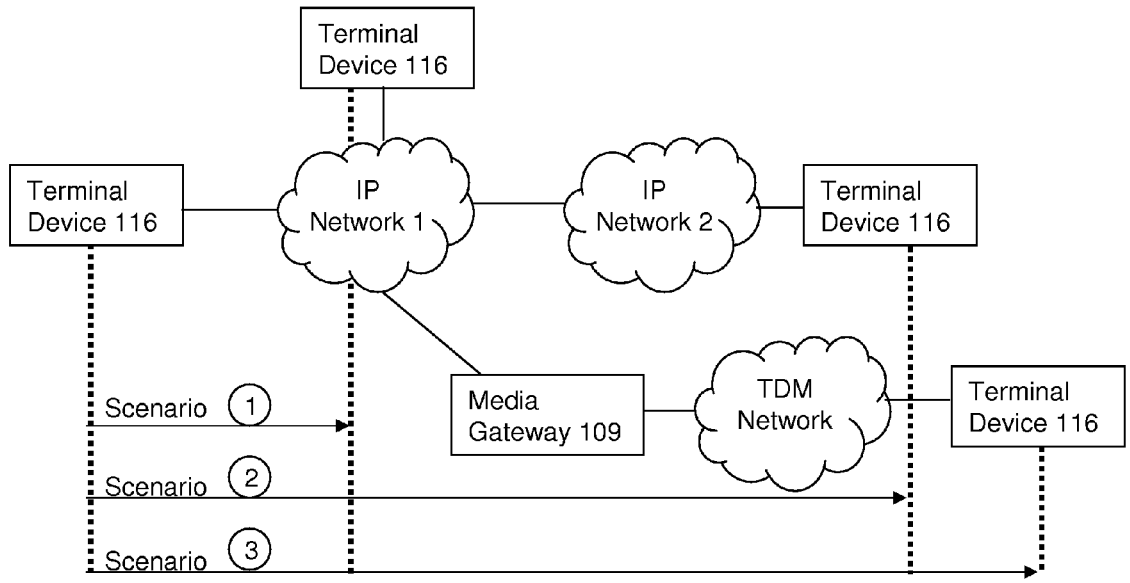
FIG. 5 depicts points of demarcation in the communication system.

FIG. 5 depicts demarcation points of communication between the terminal devices 116. For example, terminal devices 116 can establish in-network communications (i.e., communications that take place within a single service provider's network) as depicted by scenario 1. Alternatively, communications between terminal devices 116 can span out-of-network communications (e.g., two independently operated IP networks 1 & 2) as shown by scenario 2. In yet another embodiment, communications between terminal devices 116 can span a hybrid of packet-switched and circuit-switched (or TDM) elements as shown in scenario 3. Network elements at the end points of these scenarios and/or therebetween can perform quality measurements as described earlier, which can be supplied in step 302 to a terminal device 116 initiating the call and/or the terminal device 116 accepting the call.

Figure 4:
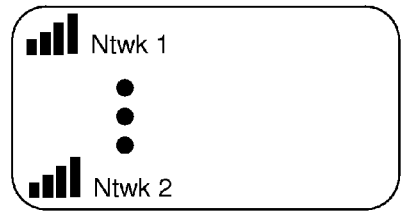
FIG. 4 depicts an exemplary embodiment of a Graphical User Interface (GUI) presented by a display element of the terminal device.

With this quality information, the terminal device 116 can in step 304 present by way of display 210 one or more quality indicators as shown in FIG. 4. The quality indicators can be graphically represented by zero or more bars that collectively correspond to a dynamic signal strength icon. The icon can be adjusted by removing or adding bars. A lack of bars can represent no signal or extremely poor VoIP communications. As bars are added, the quality of VoIP communications improves. A full set of bars (e.g., 4 bars) for example can represent the best possible quality of communications in a VoIP session. The terminal device 116 can be programmed to utilize quality objectives set forth by a service provider for presenting in step 304 each dynamic state of the quality of indicators. For example, a no bars state can result from quality information that exceeds a first packet loss rate and latency threshold. A range between the first packet loss rate and latency threshold and a second packet loss rate and latency threshold can result in a single bar. Additional ranges can be specified by the service provider to define the remaining signal strength bars.

In step 306, the terminal device 116 can be programmed to check for changes in the quality level retrieved from the VoIP session. If quality information retrieved from a SIP message indicates a degradation in the quality of the call, the terminal device 116 proceeds to step 308 where it adjusts the one or more quality indicators respectfully (e.g., by removing one or more bars). Depending on where the degradation is taking place, one or more of the quality indicators shown in FIG. 4 will be adjusted. When independently operated networks are used to establish the VoIP session, more than one quality indicator can be presented each accompanied with an identification of the corresponding network being measured. This provides the end user of the terminal device 116 a means to determine which of the service providers is experiencing communication issues.

It would be evident to an artisan with ordinary skill in the art that the aforementioned embodiments can be modified, reduced, or enhanced without departing from the scope and spirit of the claims described below. For example, other iconic representations can be used for demonstrating a quality of communications other than those shown in FIG. 4. Greater resolution can be provided to the end user than is presented in this disclosure to determine the source of communication issues in the communication system 100. Quality information can be presented at a terminal device 116 audibly rather than just graphically. Any present or future means for quantifying the quality of a VoIP session can be used by the network elements and terminal devices 116 for presenting a quality of VoIP communications. The terminal devices 116 can also represent a computing device such as a desktop computer or laptop capable of VoIP communications.

These are but a few examples of modifications and/or enhancements that can be applied to the present disclosure without departing from the scope of the claims. Accordingly, the reader is directed to the claims below for a fuller understanding of the breadth and scope of the present disclosure.

Figure 6:
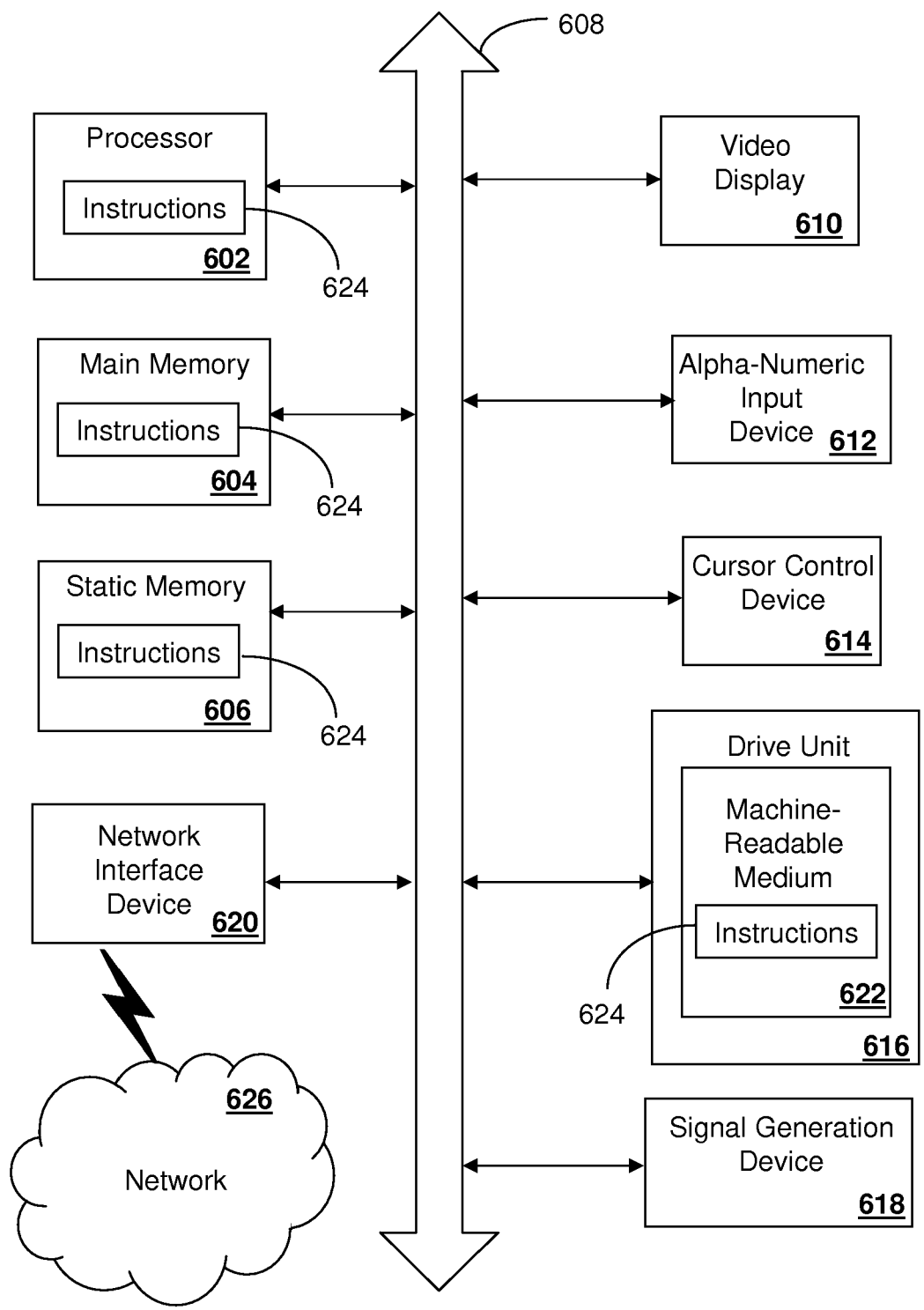
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A terminal device, comprising:
a controlling element for processing Voice over IP (VoIP) data received from a plurality of network elements in a communication system and for determining quality information based on the received VoIP data, wherein the VoIP data is associated with a VoIP communication session between the terminal device and another terminal device; and
a display element that presents a plurality of quality indicators adjusted according to the quality information during the VoiP communication session, wherein two or more quality indicators are presented corresponding to two or more independently operated networks being measured where at least one quality indicator represents quality information for a first independently operated network and at least a second quality indicator represents quality information for a second independently operated network;
wherein the terminal device comprises one among a wireline and wireless customer premise equipment, and wherein each of the quality indicators corresponds to a select one among in-network and out-of-network portions of the communication system,
wherein each of the quality indicators comprises a dynamic signal strength icon,
wherein the dynamic signal strength icon comprises zero or more graphical bars,
wherein a quality of communications of a portion of the communication system is represented by a number of graphical bars presented by the display element, and
wherein the communication system comprises a hybrid of packet-switched and circuit-switched elements such that communications between terminal devices span the hybrid of the packet-switched and circuit-switched elements, wherein at least one of the network elements of the plurality of network elements supports packet-switched communication, and wherein at least one of the network elements of the plurality of network elements supports circuit-switched communication.

2. The terminal device of claim 1, wherein the quality of communications is determined from at least one among a packet loss rate, a packet transmission latency, and jitter associated with the VoIP data exchanged with the communication system.

3. The terminal device of claim 1, wherein the quality of information conforms to a Session Initiation Protocol (SIP).

4. The terminal device of claim 1, wherein the communication system comprises one or more independently operated communication networks, and wherein each of the quality indicators corresponds to a select one of the one or more independently operated communication networks.

5. The terminal device of claim 4, wherein the display element presents an identity for each of the one of the one or more independently operated communication networks.

6. The terminal device of claim 1, wherein the quality of communications of a portion of the communication system is further represented audibly by the wireline or wireless customer equipment.

7. The terminal device of claim 1, wherein the circuit-switched elements comprise time-division multiplexing (TDM) elements.

8. A non-transitory computer-readable storage medium in a first terminal device, comprising computer instructions for:
receiving at the first terminal device Voice over IP (VoIP) data associated with a VoIP session taking place in a communication system between the first terminal device and a second terminal device; determining at the first terminal device quality information based on the VoIP data; and
presenting a Graphical User Interface (GUI) during the VoIP session at the first terminal device comprising a plurality of quality indicators adjusted according to the determined quality information during the VoIP session wherein two or more quality indicators are presented corresponding to two or more networks being measured during the VoiP session; wherein the terminal device comprises one among a wireline and wireless customer premise equipment, and wherein each of the quality indicators corresponds to a select one among in-network and out-of-network portions of the communication system; wherein each of the quality indicators comprises a dynamic signal strength icon, wherein the dynamic signal strength icon comprises zero or more graphical bars, and wherein the storage medium comprises computer instructions for presenting in the GUI a quality of communications of one or more portions of the communication system according to a number of graphical bars presented in the GUI, and wherein the communication system comprises a hybrid of packet-switched and circuit-switched elements such that communications between terminal devices span the hybrid of the packet-switched and circuit-switched elements.

9. The non-transitory computer-readable storage medium of claim 8, wherein the storage medium comprises computer instructions for adjusting each of the quality indicators according to the quality information retrieved from the VoIP data.

10. The non-transitory computer-readable storage medium of claim 8, wherein the communication system comprises one or more independently operated communication networks, and the storage medium comprises computer instructions for presenting quality indicators each corresponding to a select one of the one or more independently operated communication networks.

11. The non-transitory computer-readable storage medium of claim 10, comprising computer instructions for presenting in the GUI an identity for each of the one of the one or more independently operated communication networks.

12. A method comprising: receiving Voice over IP (VoIP) data from a plurality of network elements in a communication system, the VoIP data being received at a first terminal device and being associated with a communication session between the first terminal device and a second terminal device; selecting at least two VoIP parameters associated with the VoIP data, the selection being made by the first terminal device; determining quality information based on the at least two parameters, the determination being made by the first terminal device; displaying two or more quality indicators adjusted according to the quality information during the communication session and representative of the quality information during the communication session corresponding to two or more networks being measured during the communication session between the first terminal device and the second terminal device each with an indication of the corresponding network being measured; wherein the terminal device comprises one among a wireline and wireless customer premise equipment, and wherein each of the quality indicators corresponds to a select one among in-network and out-of-network portions of the communication system; and wherein the communication system comprises a hybrid of packet-switched and circuit-switched elements such that communications between terminal devices span the hybrid of the packet-switched and circuit-switched elements.

13. The method of claim 12, wherein the first and second terminal devices comprise one among wireline and wireless customer premise equipment.

14. The method of claim 12, wherein the one or more quality indicators comprise a plurality of quality indicators representing in-network and out-of-network portions of the communication system.

15. The method of claim 12, wherein the communication system comprises a hybrid of packet-switched and circuit-switched elements such that communications between terminal devices span the hybrid of the packet-switched and circuit-switched elements, and wherein at least one of the network elements of the plurality of network elements supports packet-switched communication, and wherein at least one of the network elements of the plurality of network elements supports circuit-switched communication.

* * * * *